United States Patent [19]

Twitchell et al.

[11] 4,351,562

[45] Sep. 28, 1982

[54] MOVABLE SEAT FOR A MOTORIZED TRANSPORT CHAIR

[76] Inventors: Brent L. Twitchell, 3451 W. 4400 South, Granger, Utah 84120; Kendel S. Twitchell, 1569 Shenandoah Cir., Murray, Utah 84107; Brent W. Zitting, 4271 Charles Dr., Granger, Utah 84120

[21] Appl. No.: 164,707

[22] Filed: Jul. 17, 1980

[51] Int. Cl.[3] .............................................. B62D 11/04

[52] U.S. Cl. ................................ 297/345; 180/65 R; 180/79.1; 180/DIG. 3; 297/349; 297/378; 297/411

[58] Field of Search .................. 296/65 R; 180/65 R, 180/65 E, DIG. 3, 79.1; 297/345, 349, 378, 411; 248/421

[56] References Cited

U.S. PATENT DOCUMENTS

| | | | |
|---|---|---|---|
| 2,592,023 | 4/1952 | Gleason | 180/DIG. 3 |
| 3,112,001 | 11/1963 | Wise | 180/DIG. 3 |
| 3,123,400 | 3/1964 | Paulson | 297/314 |
| 3,213,957 | 10/1965 | Wrigley | 297/378 X |
| 3,252,247 | 5/1966 | Miller et al. | 180/79.1 X |
| 3,314,189 | 4/1967 | Carroll | 180/79.1 X |
| 3,521,722 | 7/1970 | Dimonte | 296/65 R X |
| 3,901,337 | 8/1975 | Cragg | 180/DIG. 3 X |
| 3,905,436 | 9/1975 | Karchak et al. | 180/DIG. 3 X |
| 4,077,483 | 3/1978 | Randolph | 180/DIG. 3 X |
| 4,274,503 | 1/1981 | MacKintosh | 180/DIG. 3X |

*Primary Examiner*—Joseph F. Peters, Jr.
*Assistant Examiner*—Michael Mar
*Attorney, Agent, or Firm*—M. Reid Russell

[57] ABSTRACT

The present invention is a movable seat for arrangement with a motorized transport chair for use by a handicapped person. The movable seat is motorized to provide a lifting and pivoting capability to a person sitting thereon by their operating a hand control and includes a back that is hinge connected whereby the back can be pivoted to a seat bottom engaging attitude, lowering the seat vertical dimension appropriately. Additionally, the seat back can be provided with arms arranged to maintain a parallel attitude to the seat bottom as the seat back is pivoted.

9 Claims, 16 Drawing Figures

MOVABLE SEAT FOR A MOTORIZED TRANSPORT CHAIR

The present invention relates to electrically operated motorized transport chairs and seat configurations therefor suitable for handicapped persons.

Transport chairs for providing mobility to an injured or handicapped person are, of course, not new, but have traditionally involved a rigid or collapsible metal frame whereacross a person sits, and have included large rear wheels and smaller diameter, caster type front wheels. Such chairs when they are motorized have generally included arrangements for driving the rear wheels, and have provided for turning by appropriate operation or braking of one or the other rear wheels. Such arrangements have often not included separate wheel braking capability, relying rather on motor drag to provide braking. Further, such chairs have generally included fabric seats stretched across a frame and, though in many cases they have had the capability of folding, the chair itself has generally been so large and heavy as to limit its portability. The present invention provides a unique approach to transport for the handicapped in that it: teaches a streamlined motorized chair that is designed for occupant comfort; is operated by a single stick control; for safety, has a low center of gravity; provides for both independent driving of rear wheels and independent braking thereof and provides powered turning control of front wheels thereof. Additionally, while former chairs have generally involved fixed seats, the present invention provides a seat having both a powered height adjustment and pivoting capability.

It is, therefore, a general object of the present invention to provide a motorized transport chair that is designed for both the comfort and safety of an occupant, that incorporates independent rear wheel braking, that includes powered drive train and steering assemblies, that are controlled by a single control, and preferably includes a motorized seat therefor to both lift and rotate appropriately with an occupant seated therein.

It is an additional object of the present invention to provide an electrically powered seat for the motorized transport chair that, additional to having a capability for both independent elevation and rotation, is arranged to be collapsible to minimize the chair height dimension for facilitating loading and transport in a van, station wagon, hatchback vehicle, or the like.

It is an additional object of the present invention to provide a motorized transport chair that has a pleasing, aesthetic appearance, is safe and reliable in its operation and is sufficiently powerful and ruggedized to provide it with a long and useful life.

In accordance with the above objects, the present invention in a motorized transport chair and improved seat therefor, consists of a body that is preferably fabricated by molding methods from a plastic material to present a streamlined low profile and has appropriate recesses or wells formed therein for receiving an occupant's feet, which body is arranged to mount an improved power seat, which seat will be described in detail later herein. The body includes wheel wells formed at the corners thereof and is arranged for attachment to a chassis or frame. The frame includes a metal support plate whereon are arranged storage batteries that supply electricity through a single stick control. The stick control is arranged for convenient operation by an operator sitting in the seat, and electrically connects to individual electrical motors that drive through appropriate transmission, which motors and transmissions are all mounted to the plate, to turn individual rear wheels. Each transmission includes a separate disk brake system therewith that operates when power is removed therefrom.

The battery, through the stick control, also connects to a power steering assembly that includes a pair of tie rods that each connect on one end to the chair front wheels steering assemblies and to a bell crank at the other ends, which bell crank is pivoted appropriately by an electric motor that is controlled by the stick control.

Secured appropriately to the chassis is a special seat of the present invention that is preferably capable of independent elevation and rotation, under the control of the operator. Further, in one embodiment, the special seat includes an arm that can be pivoted to a vertical attitude to facilitate a person's entry and, in another embodiment, provides a folding seat back configuration that is arranged to collapse towards the seat bottom, to reduce thereby the height dimension of the present invention to facilitate storage and transport thereof.

FIG. 2(*a*), is a frontal sectional view taken along the line 2(*a*)—2(*a*) of FIG. 2 showing the front wheels and axle support thereof;

FIG. 5(*a*), shows the seat erection mechanism of FIG. 5 after it has been operated to elevate the seat installed thereon;

DETAILED DESCRIPTION

Figure 1:
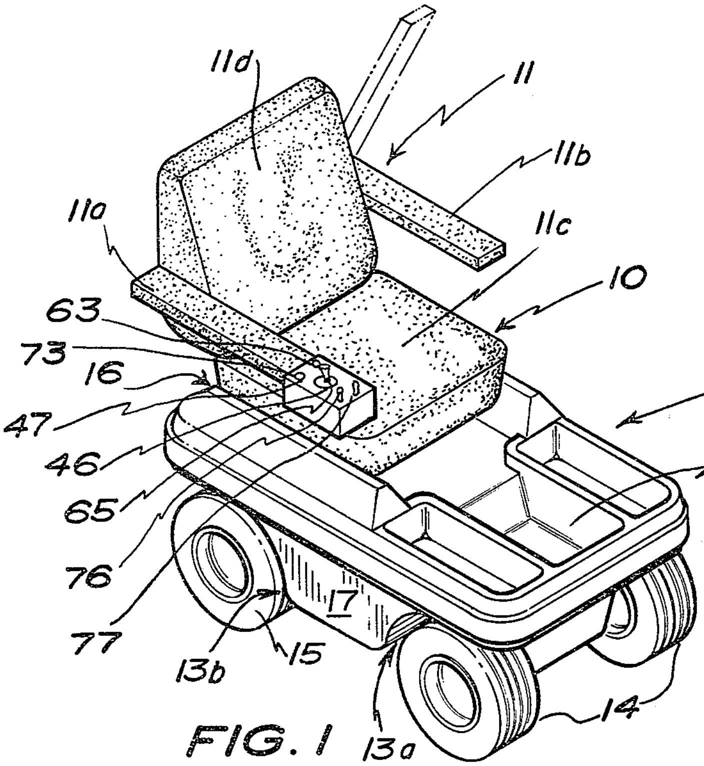
FIG. 1, shows a profile perspective view of preferred embodiment of the motorized transport chair of the present invention that includes a special seat arranged therewith, an arm of that seat shown in broken lines pivoted upwardly.
Figure 2A:
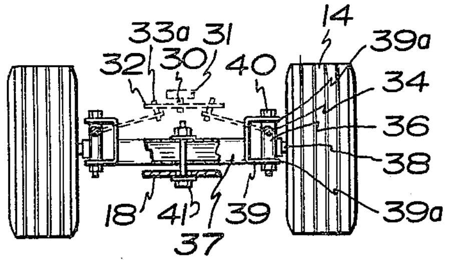
FIG. 2, is a side elevation view of the motorized transport chair of FIG. 1 showing the special seat elevated from a fully depressed attitude, a lifting mechanism thereof shown in broken lines, to an erected attitude, with the lifting mechanism shown in solid lines.
Figure 2:
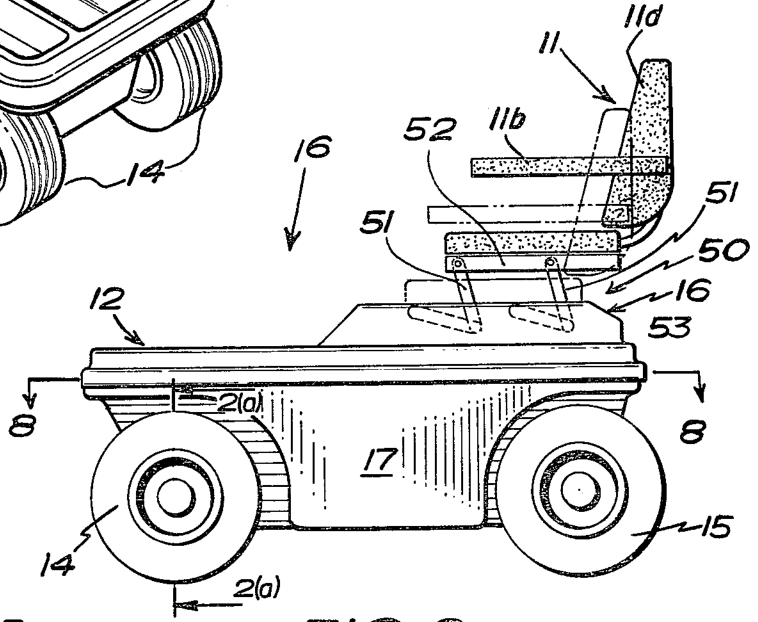
Figure 3:
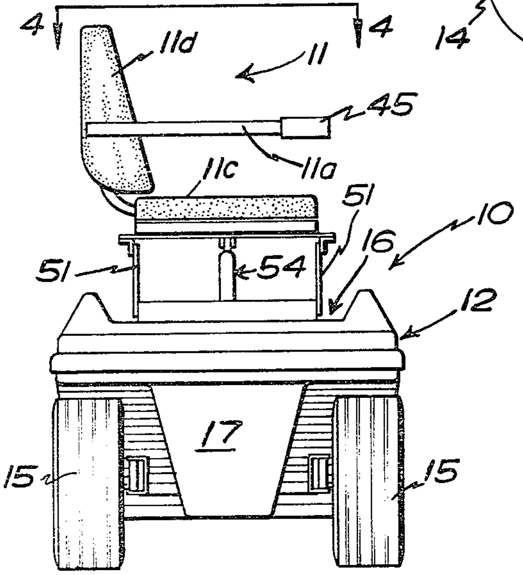
FIG. 3, is an end elevation view of the chair of FIG. 2 showing the special seat rotated through approximately ninety degrees (90°)
Figure 4:
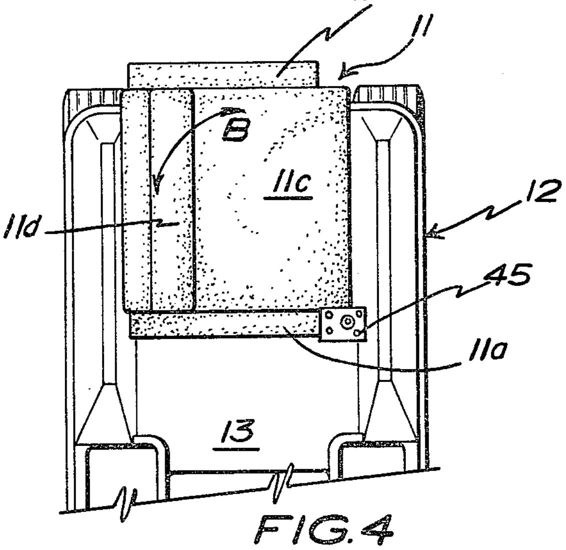
FIG. 4, is a top plane view taken along the line 4—4 of FIG. 3, showing a rear portion of the motorized transport chair and the special seat thereof, with a forward portion shown broken away.
Figure 8:
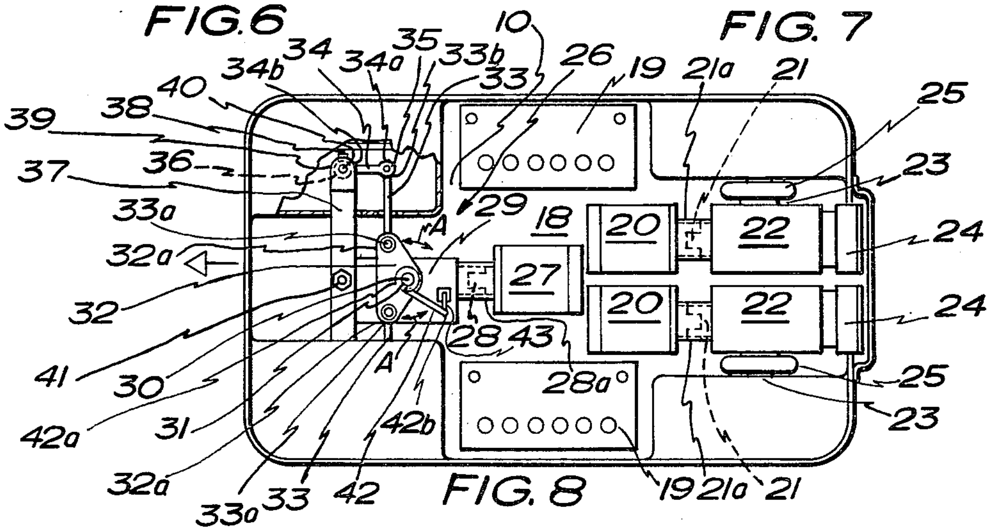
FIG. 8, is a top plan sectional view taken along the line 8—8 of FIG. 2, showing the interior of the body, exposing the power supply, drive train and steering mechanisms of the motorized transport chair.

Referring to the drawings, FIG. 1 shows a profile prospective view of a preferred embodiment of a motorized transport chair 10 of the present invention, hereinafter referred to as "chair". Shown best in FIGS. 1 through 3, chair 10 includes a special seat 11, hereinafter referred to as "seat", which seat will be described in detail later herein with respect to FIGS. 5, 5(*a*), 6. Shown in FIGS. 1 through 3, seat 11 is mounted to a body 12 that is preferably formed by molding methods from a resinous plastic material such as a A.B.S. plastic, or the like to be contoured appropriately to accommodate, within a recess 13 formed therein, the feet of a person, not shown, seated on seat 11. The body has front and rear wheel wells 13*a* and 13*b* arranged at the corners thereof to accommodate front wheels 14 and rear wheels 15, respectively, turning therein. The body 12, as shown in FIG. 2, is formed to include a platform area 16 whereto seat 11 is attached and a steering and drive train compartment 17 that contains a support plate 18 that is preferably formed from a rigid metal and, as will be described more fully with respect to FIG. 8, whereto is mounted steering and drive train assemblies and batteries 19, and whereto the forward and rear wheels 14 and 15 are mounted. As shown best in the top plan sectional view of FIG. 8, body 12 is preferably mounted to a plate 18 whereon the storage batteries 19 are supported. The storage batteries are, in turn, connected electrically through wires, not shown, to electric motors 20, that are also secured to plate 18, of independent drive trains that are linked to turn individual rear wheels 15. The independent drive trains, as shown in FIG. 8, consist of electric motors 20 that connect through couplings 21, shown in broken lines, to transmissions 22 that turn individual axles 23 that connect through journal bearings 25 to the individual rear wheels 15. Couplings 21 pass through motor spool adapters 21*a* that maintain rigid alignment of the shafts of electric motors 20 and transmissions 22. Additionally, also shown in FIG. 8, the individual transmissions 22 include disk brake units 24 that provide individual wheel braking through transmissions 22 when power is removed from electric motors 20. While not shown, it should be understood that appropriate wires are provided between the storage batteries 19, electric motors 20 and disk brake units 24 through a stick control 45, that will be described in detail later herein. Shown also in FIG. 8, the journal bearings 25 that support turning of the wheels 15, like the drive trains, are mounted to support plate 18.

Also shown in FIG. 8 is a power steering arrangement 26 of the present invention for controlling turning of front wheels 14, which arrangement consists of an electric motor 27 that turns, through a coupling 28, shown in broken lines, a steering transmission 29. The coupling 28, like coupling 21, passes through a motor spool adapter 28*a* that maintains a rigid alignment of the shafts of electric motor 27 and steering transmission 29. The steering transmission 29, turns a shaft 30 that includes a collar 31 installed thereto, whose function will be explained in detail later herein, which shaft 30 connects to a bell crank 32. The bell crank has ends 33*a* of tie rods 33 pivotally connected to the opposite ends 32*a* thereof. Opposite tie rod ends 33*b*, as shown in a broken away portion of FIG. 8, connect at a pivot 35, to an end 34*a* of a pivot arm 34. Pivot arm 34 is, in turn connected at its opposite end 34*b* into a sleeve 36 that is shown in broken lines FIG. 8, and in FIG. 2(*a*). Sleeve 36, as shown best in the sectional view of FIG. 2(*a*) has, secured at right angle thereto, a wheel axle 38 that extends at a normal angle therefrom and mounts a front wheel 14 journaled thereon. The sleeve 36, as shown therein is pivotally connected across ends 39*a* of a yoke 39, which yoke is secured to one end of beam 37 with sleeve journaled by pin 40 between the yoke ends 39*a*. So arranged, as shown in FIG. 8, beam 37 is maintained by nut and bolt 41 to support plate 18 with front wheel steering provided by pivoting of sleeves 36. Sleeves 36 are, in turn, controlled and synchronized by movement of arms 34 linked to bell crank 32 that is turned by steering motor 27. Thereby, a controlled turning of electric motor 27, in either direction, will ultimately provide for synchronized pivoting of wheels 14 to guide the chair 10. To limit the arc of travel of the front wheels to prohibit a contact with wheel wells 13*a* of the body 12, the power steering arrangement 26 preferably includes, as shown best in FIG. 8, a travel limit arm 42. Travel limit arm 42 is secured at its end 42*a* to hub 31 and at its other end 42*b* is pivotally coupled to a pivot arm 43, which pivot arm 43 is pivotally coupled on its opposite end to the housing of the steering transmission 29. So arranged, when hub 31 turns with the bell crank 32 on shaft 30 the arm 42 will move thereby, until a limit of travel thereof is reached, as illustrated by arrow A. The travel of arm 42 and pivot arm 43 thereby limits the arc of travel of wheels 14.

Powered steering and drive train systems of the chair 10, as described hereinabove, with respect to FIG. 8, are, essentially, a combination of electro-mechanical units. In practice, it has been found that electric motors 20 are preferably variable speed motors, turning in a range of speeds of from 0 rpm to 2,000 rpm. In practice, a motor manufactured by Motor Products AWOSSO Corp., identified as PR4807R Redmond Motors Div., has been found to operate effectively. In practice, couplings manufactured by Dresser Power Transmission Division, identified as Gerbing G.100 Coupling, have been employed as couplings 21*a* and 28*a*, respectively, which couplings are maintained by motor spool adapters 21 through 28 to be in perfect rigid alignment, which couplings connect through gear boxes 22 and 29, respectively. A preferred gear box 22 has been found in practice to be one manufactured by Dresser P.T.D., identified as a gear reducer, that provides for a reduction in a range of from $7.5\times1$; $10\times1$; $15\times1$ and $20\times1$, which ratio is one selected according to the needs of a person using the chair. Gear box braking, as described, is preferred and a disk brake system manufactured by the Inertia Dynamics Company and identified as Electric Disk Brake, has been found in practice to operate satisfactorily to provide for braking when electrical energy is removed therefrom.

The preferred chair 10 includes a supply of electrical power from conventional storage batteries 17, which storage batteries are preferably arranged to be recharged by an external current supply, such as a house current, or like source, not shown. Motor 27, for providing steering control, is preferably a low speed motor, and one manufactured by Motor Products AWOSSO Corp., identified as PR4807R Redmond Motors, has been found to operate satisfactorily, the motor turning an input to steering transmission 29 through the motor spool adapter 28*a*. Steering transmission 29, in turn, provides a further speed reduction and one such transmission manufactured by Dresser P.T.D., identified as Steering Box, has been found in practice to operate satisfactorily. Control of the turning of motors 20 and 27, respectively, is preferably provided by a single stick control 45 that is mounted, as shown best in FIG. 1, to arm 11*a* of seat 11. Such control 45 can be connected electrically through wires, not shown, to the respective electric motors 20 and 27, with operation of brakes 24 controlled by supply of electricity to motors 20, which motors are connected to said brakes through wires not shown. Thereby, an operator, not shown, by manually moving forward or backward, a stick 46 of the stick control 45, can control direction and speed of turning of motors 29 translating to a control of the speed travel of the chair 10, with operation of brakes 24 controlled turning off or on a master power switch. Moving the stick 46 sideways, operates motor 27, as described, to steer the chair 10. Motor 27, of course, turns in either direction as controlled by stick 46. A preferred stick control 45 is one that can be purchased as a single unit, one such control manufactured by Measurement Systems, Inc.

The preferred seat 11 of chair 10 as shown in FIGS. 1, 2 and 3 through 5, is one that is motor operated to pivot through approximately 90° and to elevate for height adjustment. Such chair rotation is represented by an arrow B shown in the top plan view of FIG. 4 to include pivoting the seat to move the seat arm 11*a* whereon control 45 is mounted, across body 12. A chair arm 11*b* is thereby positioned across the rear of body 12. Arm 11*b*, in turn is preferably arranged to pivot upwardly, as shown in broken lines in FIG. 1, to facilitate a person's movement onto a seat bottom 11*c* of seat 11, using the rear of body 12 as a step.

The pivoting arrangement of arm 11*b*, it should be understood, is an optional inclusion with the described chair 10. Without the pivoting of arm 11*b*, or with another seat embodiment as will be described with respect to FIGS. 9 through 14, a person can use the side of body 12 to facilitate his or her stepping or being lifted or helped onto seat 11. Whereafter, the seat 11 can be pivoted to a forward facing attitude and an occupant can position his feet comfortably in well 13 of body 12. Preferably, the described pivoting of seat 11 is provided by operation of an electric motor, as will be described, that is controlled through an off-on button switch 47 installed to control 45, as shown in FIG. 1. Vertical movement of seat arm 11*b* between the broken and solid line attitudes of FIG. 1 is preferably manually accomplished by a person seated on seat 11 or by another person assisting such person.

Figure 5:
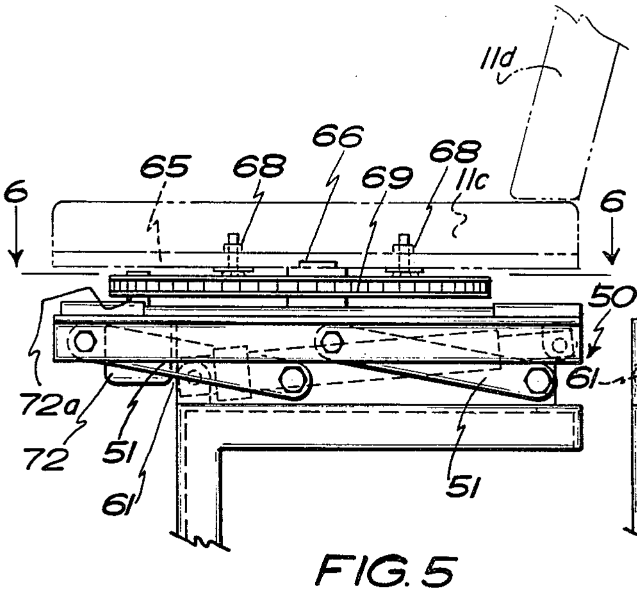
FIG. 5, shows an expanded side elevation view of a seat erection mechanism of the seat of FIG. 2, with the seat bottom and back shown illustrated by broken lines.
Figure 5A:
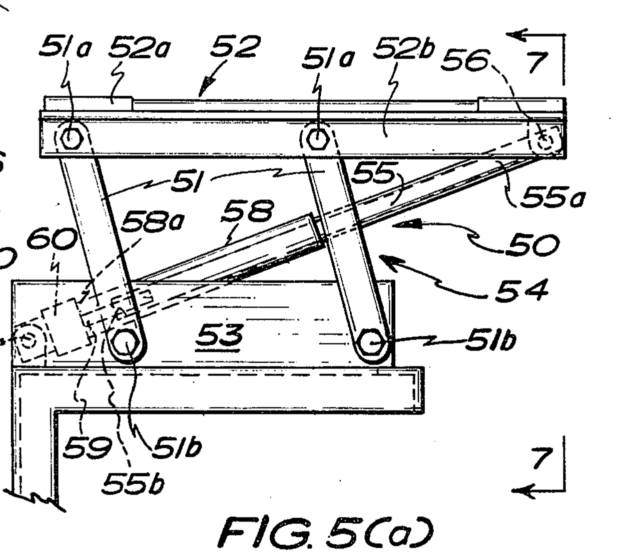

Shown best in FIG. 2, seat 11 is preferably arranged to be vertically moveable to allow for height adjustment or to lower the seat for convenience in loading chair 10 into a vehicle, or the like. To provide such seat lifting as shown in FIG. 2, the present invention preferably incorporates a rack 50 that includes individual bars 51. Bars 51 are spaced apart and each are pivotally connected at their ends, respectively, to a seat bottom frame 52. The seat bottom frame 52, as shown in FIGS. 5(*a*) and 7, consists of a flat plate 52*a* arranged between angle brackets 52*b*, which brackets receive nut and bolt combinations 51*a* therethrough to connect said bars 51, the bars connecting also to body supports 53 by nut and bolt combinations 51*b*, which supports 53 are preferably formed, as shown best in FIG. 7, from right angle members that are secured, by connectors, not shown, to the body 12 along legs 53*a* thereof. So arranged, four points of support are provided to flat plate 52*a*, with erection and collapse of rack 50 accomplished, as will be explained hereinbelow, by outward and inward movement of a piston portion 55 of a screw lift 54. Shown best in FIGS. 5(*a*) and 7, an end 55*a* of piston portion 55 is pivotally connected by a nut and bolt combination 56 across lift brackets 57 that extend downwardly from the undersurface of flat plate 52*a*, which piston portion 55 is arranged to telescope outwardly from a barrel 58 of the screw lift 54. Shown best in phantom lines of FIG. 5(*a*) piston portion 55 is preferably a pipe, or the like, that is internally threaded at 55*b* to be turned over a threaded end of a motor shaft 59. The motor shaft 59 extends from and is turned by a motor 60 whereto the barrel is secured at 58*a* as shown in FIGS. 5(*a*) and 7. In turn, the motor 60 is pivotally connected by a nut and bolt combination 61, or the like, that extends across the screw lift 54, between legs 62*b* of L-shaped brackets 62. As shown best in FIG. 7, brackets 62 are secured along their short legs 62*a* to body 12.

In operation, turning of motor shaft 59 by motor 60 causes piston portion 55 to extend from or retract into barrel 58, shortening or lengthening the screw lift 54 to lift or lower the seat bottom frame 52 between the attitudes shown in FIG. 5 and FIG. 5(*a*). Control of the operation of motor 60 is preferably provided through wires, not shown, that connect to batteries 19 through a button switch 63 arranged on control 45, as shown in FIG. 1. So arranged, a person, not shown, sitting on seat bottom 11*c* can conveniently raise or lower the seat 11 appropriately to comfortably accommodate his body therein. A device suitable as screw lift 54 of the present invention has been found in practice to be one manufactured by Warner Electric Company.

Figure 6:
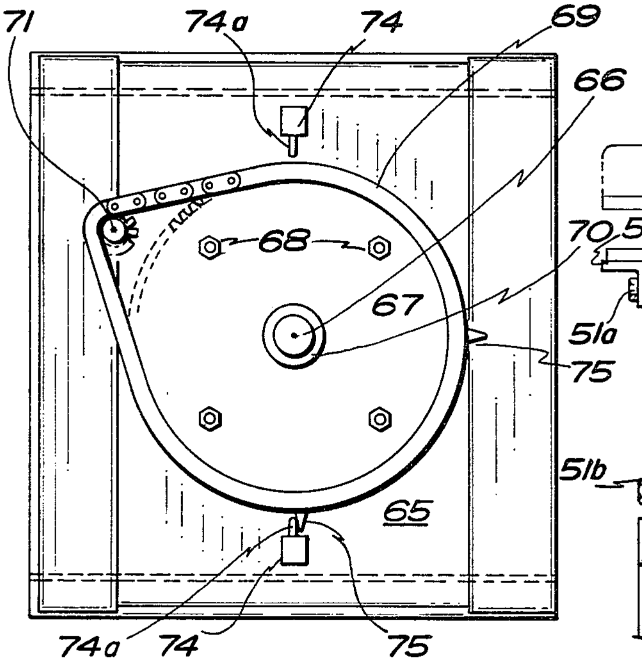
FIG. 6, is a sectional view taken along the line 6—6 of FIG. 5, a seat pivoting arrangement.
Figure 7:
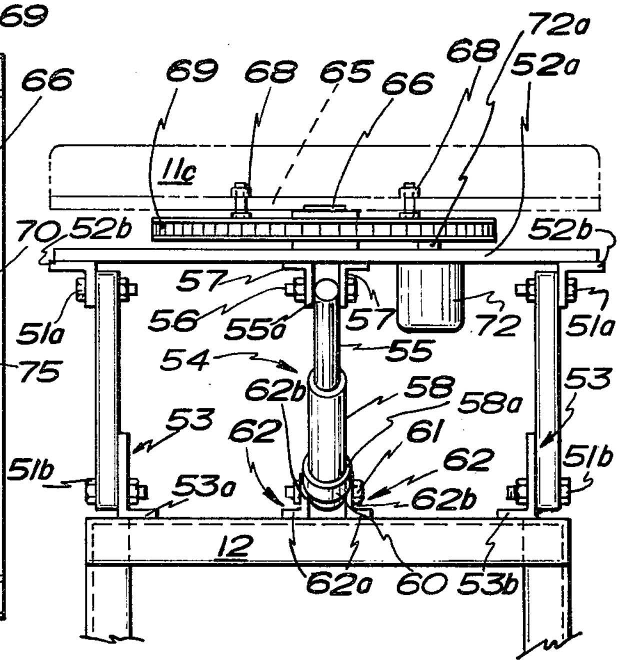
FIG. 7, is an end sectional view taken along the line 7—7 of FIG. 5(*a*)

Additional to the above described powered lifting capability of seat 11, seat 11 also preferably includes a rotation capability. Such seat rotation is illustrated by arrow B in FIG. 4, as preferably limited to a ninety degree (90°) arc, and as shown best in FIGS. 5, 5(*a*) and 6, the elements that provide this rotation capability include mounting of seat bottom 11*c*, as shown in FIGS. 6 and 7, to a seat bottom plate 65. The seat bottom plate 65, as shown in FIG. 7, is mounted by bolts and nuts 68 to a driven gear 67, which driven gear as shown best in FIG. 7, is spaced apart from the flat plate 52*a* of the seat bottom frame 52 to provide for free passage thereover. The driven gear 67, as shown best in FIG. 6, includes appropriate teeth, that mesh with continuous chain 69 that is fitted thereon, and passes around a driver gear 71. Shown best in FIG. 6, the driven gear 67 includes a center bearing 70 that is secured thereto and receives, as shown in FIGS. 5 and 7, a pivot 66 journaled therethrough that extends upwardly from the flat plate 52*a* of the seat bottom frame 52. So arranged, driven gear 67, with seat bottom plate 65 attached thereto, is free to rotate on pivot 66. This rotation, as stated above and as will be described later herein, is preferably controlled such that the seat 11 will turn through approximately a ninety degree (90°) arc only. Shown best in FIG. 6, turning of the driven gear 67 is accomplished by turning of a driver gear 71, which driver gear, as shown in FIG. 7, is turned through a shaft 72*a* by an electric motor 72 that is secured to an undersurface of the flat plate 52*a* of seat bottom frame 52. Electric motor 72 is also connected electrically through the battery 19 to a push button 73 shown on control 45 in FIG. 4, convenient for operation by a person, not shown, seated in seat 11.

Seat 11 rotation is preferably limited by limit switches 74, that, as shown in FIG. 6, are preferably mounted to the seat bottom frame 52 at approximately one hundred eighty degree (180°) points on driven gear 67 across from one another. The limit switches are electrically connected to motor 72 to turn the motor off when one arm 74*a* of a switch engages one of pins 75, which pins 75 extend outwardly from chain 72. So arranged, the rotation of the seat 11 is thereby limited by contact of switches 74 with pins 75.

Shown best in FIG. 1, the control 45, additional to the described stick 46 and push buttons 63 and 73, preferably also include toggle switches 76 and 77. The toggle switches, respectively, connect batteries 19 to the respective described motors and operate disk brakes 24, as described earlier herein, the other switch arranged to place batteries 19 on line for charging, as to an external source by a conventional plug, or a like arrangement, not shown.

Figure 9:
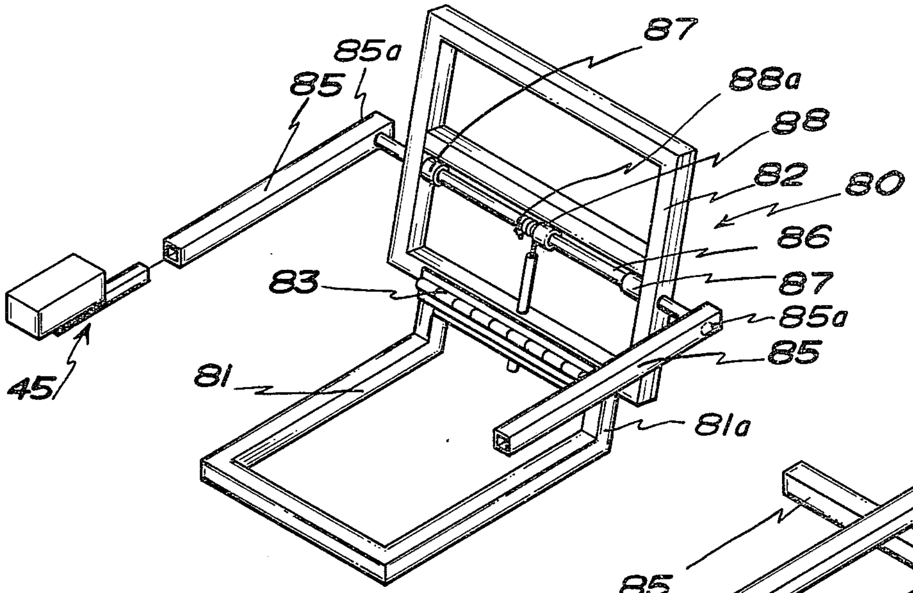
FIG. 9, is a profile perspective view of a frame representing one embodiment of a special seat showing a stick control exploded outwardly from one arm thereof, the seat frame shown to include a hinge connection of a seat back to a seat bottom with a cable shown connecting pivoting arms thereof to the seat bottom.
Figure 10:
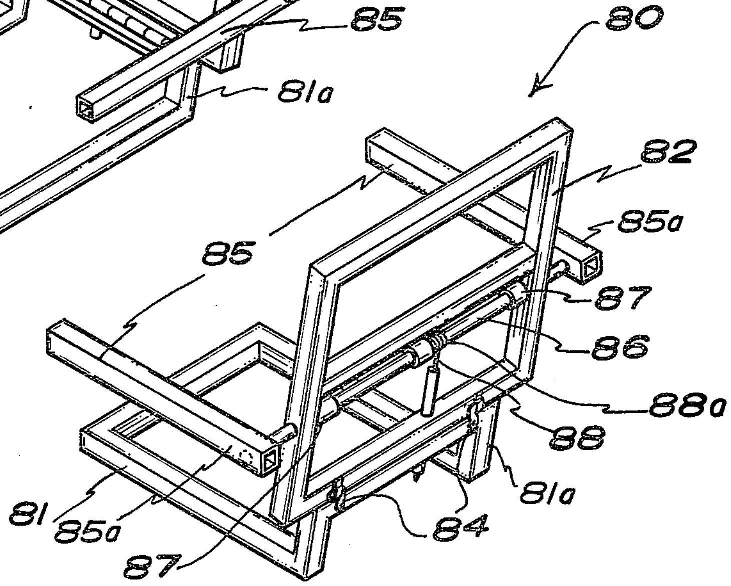
FIG. 10, is a profile perspective view taken from the rear of the seat frame of FIG. 9, less the stick control.
Figure 11:
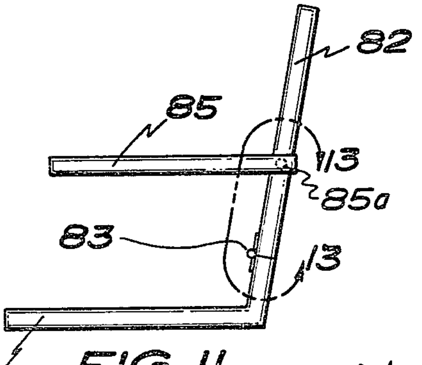
FIG. 11, is a side elevation view of the seat frame of FIG. 10.
Figure 12:
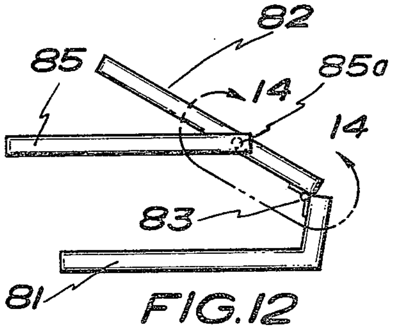
FIG. 12, is a view like that of FIG. 11, only showing the seat back tilted forward with the seat arms pivoted to present a minimum vertical dimension.
Figure 13:
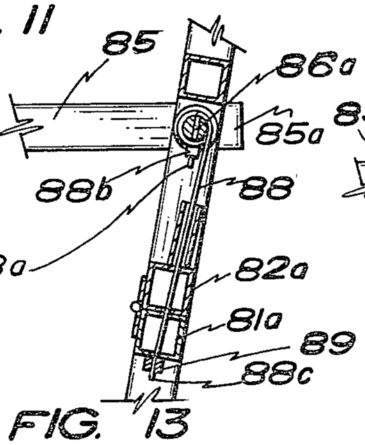
FIG. 13, is a side elevation sectional view taken within the line 13—13 of FIG. 11, showing the cable connection between an axle, whereto the seat frame arms are secured, and a cross member of the seat bottom whereto the cable is anchored.
Figure 14:
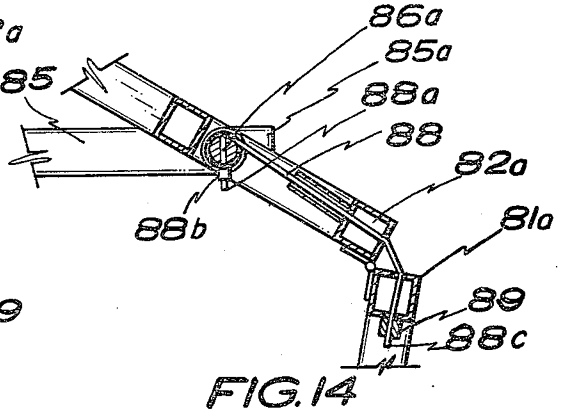
FIG. 14, is a sectional view taken within the line 14—14 of FIG. 12 showing the seat back pivoted forward with the chair arms rotated upwardly.

The chair 10, as described hereinabove with respect to FIGS. 1 through 8 shows a first preferred embodiment of seat 11. FIGS. 9 through 14 describe another embodiment of a seat 80 that should be understood could be substituted for the described seat 11 to function essentially as the described seat 11 does excepting as to a rotation capability of seat arm 11*b*. Referring to FIGS. 9 and 10, the seat 80 is shown therein as a tubular frame only, but it should be understood that the seat 80, of course, would include springs, covering, and the like, as appropriate within the scope of this disclosure. Seat 80, shown best in FIGS. 9 and 10, includes a seat bottom 81 that is upturned in a dog leg end 81*a* and a seat back 82. The seat back and the dog leg end of the seat bottom are connected across edges thereof by a hinge 83. So arranged, the seat back 82 can be pivoted towards the seat bottom 81. To prohibit an unwanted pivoting of seat back 82 towards seat bottom 81, latches 84 are preferably provided to connect the seat bottom and seat back across the hinge 83, providing a locking of the seat back in an upright attitude. Additional to the seat back collapsing capability described above, seat 80 also preferably provides for an upward rotation of the seat arms 85, which rotation will occur, as described hereinafter when the described seat back pivot is pivoted towards the seat bottom.

Shown in FIGS. 9 and 10, ends 85*a* of seat arms 85 are secured to an axle 86 that is journaled across and through the seat back 82, which axle includes positioning collars 87 to maintain the position of the axle 87 and connected seat arms 85 relative to the seat back 82. A cable 88 is shown in FIGS. 9, 10, 13 and 14 wrapped around axle 86. An end 88*a* of which cable, as shown best in FIG. 13, after passage through a hole 86*a* through axle 86 is maintained thereto by a block 88*b* that receives and locks to the cable end. So arranged, the cable 88 travels through cross members 81*a* and 82*a* of, respectively, the seat bottom 81 and seat back 82 and has its opposite end 88*c* secured, as shown best in FIGS. 13 and 14, by passing it through and locking it in a block 89 arranged below the seat bottom cross member 81*a*. Cable 88, it should be understood, is essentially inelastic. So arranged, when seat back 82 is collapsed towards the seat bottom 81, as described hereinabove, and shown in schematics of FIGS. 11 and 12, cable 88 will hold axle 86, in place as shown best in FIG. 14. Thereby arms 85 are pivoted upwardly as the seat back 82 collapses toward seat bottom 81, as illustrated in FIGS. 11 through 14. Obviously, as the arms 85 are connected to operate together, individual pivoting of one arm without the other, as illustrated with respect to arm 11 of FIG. 1, is not provided for in this embodiment. However, of course, by altering the connection arrangement of one or both arms 85 with axles 26, as by a use of a bushing, or the like, not shown, such independent arm pivoting could be provided for within the scope of this disclosure. It should, of course, be obvious that the seat lifting and rotation capabilities described earlier herein with respect to seat 11 could be included with seat 80 within the scope of this disclosure.

Shown in FIG. 9, the stick control 45 has been exploded away from a chair arm 85 to illustrate that the control can be plugged into the chair arm, utilizing male and female connectors, or the like, not shown, to provide electrical connection of the control to the described components within the scope of this disclosure.

While not shown, it should be understood that the present invention preferably includes appropriate electrical circuitry, switches and components, not shown, for appropriately and safely connecting the various electrical elements and components through the control 45. Also, the features of the two different seats 11 and 80 that have been shown and described herein could be, within the scope of this disclosure, incorporated together, as appropriate. Further, it should be obvious that the particular configuration of wheels, body and frame or plate shown herein, could be modified as required, to accommodate a person's needs and, conceivably, a single front wheel could be substituted for front wheels 14 within the scope of this disclosure. Similarly, the described steering arrangement could then be modified appropriately for operating such single wheel 14, also within the scope of this disclosure. While a preferred body 12 configuration and appearance has been shown and described herein, it should be understood that the appearance can be modified as appropriate to the needs of a person using the chair 10, and the body 12 could incorporate other attachments therewith, such as an awning or the like, not shown, within the scope of this disclosure.

Independently driven rear wheels 15 have been shown herein as being preferred, though it should be understood that a single axle could be arranged through a single transmission or through both transmissions, arranged to be turned by one or more motors, which arrangement would then require a single disk brake 24 therewith, within the scope of this disclosure. Also, while disk brakes 24 are shown as being preferred inclusions with the chair 10, it should be obvious that braking could be provided by appropriate reversing of the motors 22, or even by a utilization of the resistance to turning of motors 22, to provide braking within the scope of this disclosure. Additionally, while the specified motors, transmissions and brake arrangements described herein are preferred, it should be understood that other motors, transmissions and braking arrangements or systems could be so employed within the scope of this disclosure and that the stated gear ratios, motor turning rates, and the like, are for example only, and could be altered appropriately, within the scope of this disclosure. It should be obvious from this disclosure that the particular electric motors for chair lifting and rotation and steering are slow-speed motors, that can be conveniently reversed to provide turning in either direction.

While a preferred embodiment of the present invention in a motorized transport chair and an improved seat therefore has been shown and described herein, it should be understood that the present disclosure is made by way of example only, and that variations are possible without departing from the subject matter coming within the scope of the following claims, which claims we regard as our invention.

We claim:

1. A movable seat for arrangement with a transport chair comprising, a seat that includes a bottom and a back that is connected thereto by a hinge arrangement such that said back can be pivoted forwardly to engage said seat bottom;

a seat support means arranged with the transport chair for supporting said seat thereto;

arm means fixed by connection means at ends thereof to the ends of an axle that is journaled across the seat back above said hinge arrangement; and cable means secured on one end thereof to said seat back below said hinge arrangement with the other cable means and wound around and secured to said axle, said cable means being drawn taut to prohibit axle rotation during rotation of said seat back to maintain said arm means in essentially a parallel attitude over said seat bottom.

2. A movable seat as recited in claim 1, further including latch means for releasably maintaining the seat back in an upright attitude with respect to the seat bottom.

3. A movable seat as recited in claim 1, further including a rack consisting of four equal length straight arms that are individually pivotally connected at their ends in pairs to opposite sides of the seat support means and to a seat bottom frame to support said seat bottom frame vertical movement, maintaining said seat bottom frame in a parallel attitude to said seat support means during said vertical movement;

means for vertically moving said rack, equally pivoting said arms, to vertically move said seat bottom frame relative to said seat support means;

a pivot means secured to extend upwardly at a normal angle from said seat bottom frame;

a gear means journaled on said pivot means to turn freely thereon;

a seat bottom plate mounted to said gear means and mounting said seat bottom thereon; and means for turning said gear means and connected seat bottom.

4. A movable seat as recited in claim 3, wherein the means for vertically moving the rack is a screw lift that is pivotally connected to the seat support means and includes a piston arranged to telescope therefrom that pivotally connects on one end to the seat bottom frame; and means for extending said piston from said screw lift.

5. A movable seat as recited in claim 4, wherein the screw lift includes a motor turning a threaded output shaft that has an internally threaded portion of the piston turned thereover, and means for controlling extension of said piston.

6. A movable seat as recited in claim 3, wherein the gear means is a sprocket whereover a continuous chain is arranged;

the means for turning said gear means is a drive gear meshing with to move said continuous chain; and means for turning said drive gear.

7. A movable seat as recited in claim 4 further including stop means arranged with gear means for limiting turning thereof.

8. A movable seat as recited in claim 7, wherein the stop means consists of limit switch means arranged with the seat bottom frame, next to the path of travel of the continuous chain, which limit switch means is connected electrically to the means for turning said drive gear; and a plurality of posts secured to extend at intervals from along said continuous chain to engage said limit switch means when said continuous chain is moved appropriately.

9. A movable seat as recited in claim 1 wherein the connection means is a bushing means.

* * * * *